Feb. 6, 1962 F. M. BAILEY ETAL 3,019,711
CONTROL SYSTEMS FOR POSITIONING OBJECTS HAVING HIGH INERTIA
Filed Dec. 26, 1956 6 Sheets-Sheet 5
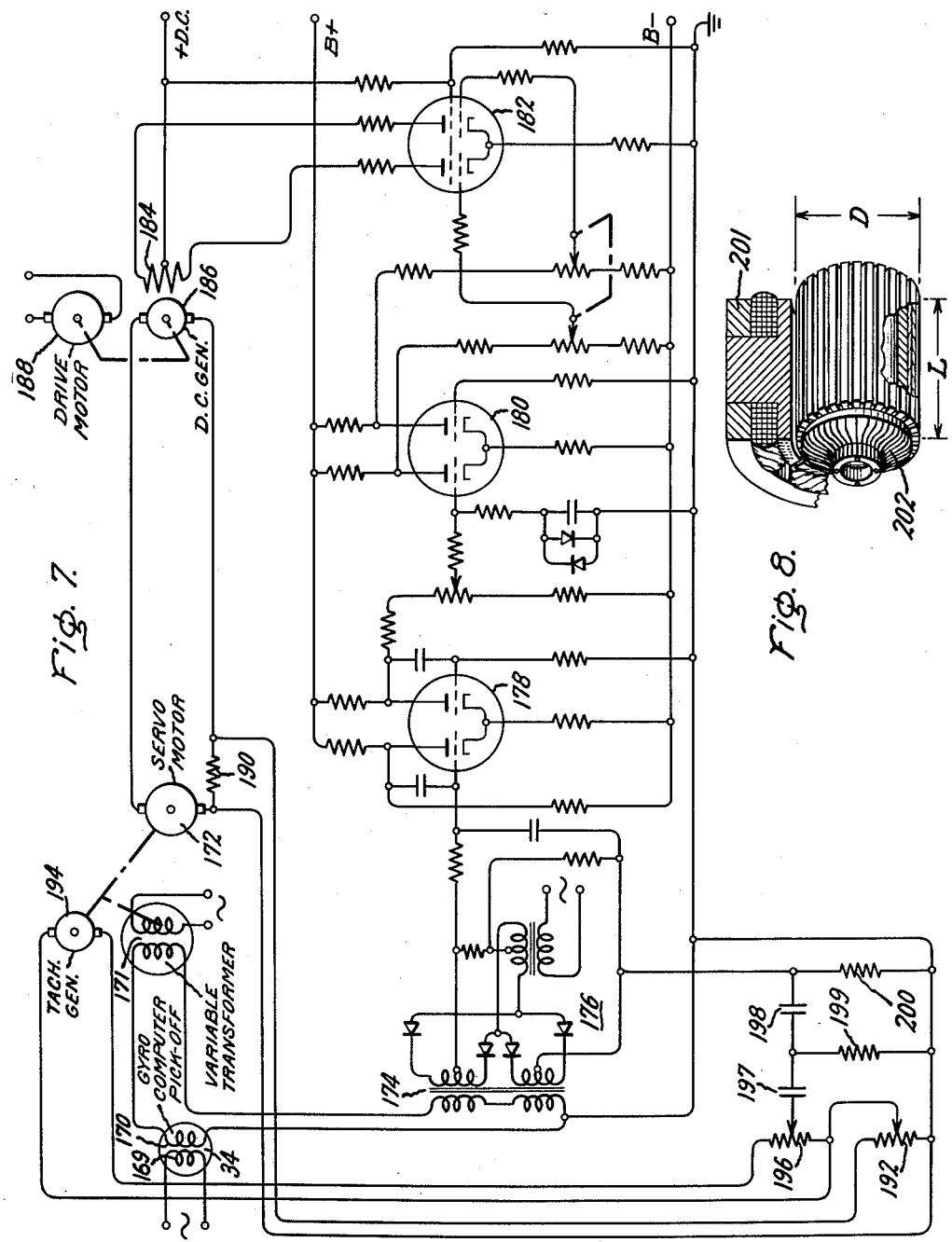
Inventors:
Eugene B. Canfield,
Francis M. Bailey,
by Roe D McBurnett
Their Attorney.

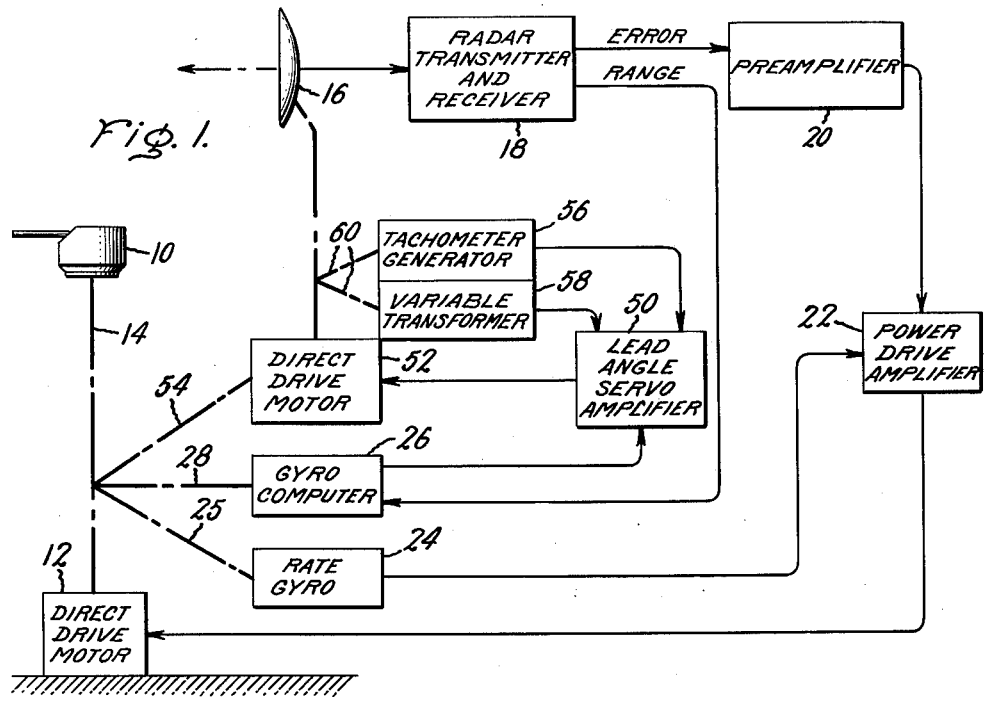
Fig. 1.
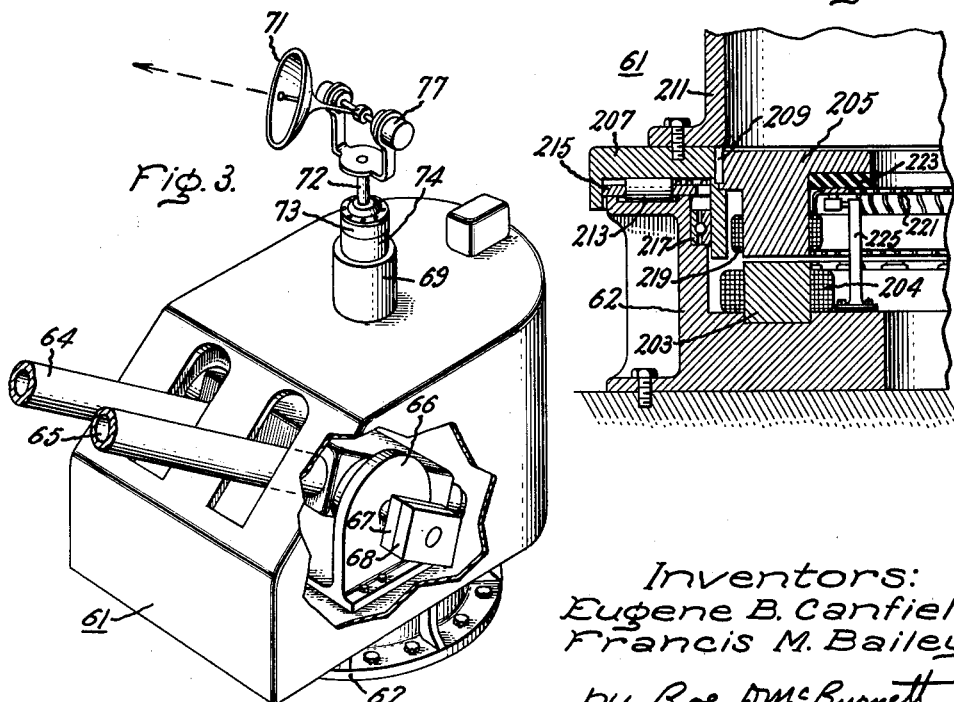
Fig. 3.
Fig. 9.
Inventors:
Eugene B. Canfield,
Francis M. Bailey,
by Roe D. McBurnett
Their Attorney.

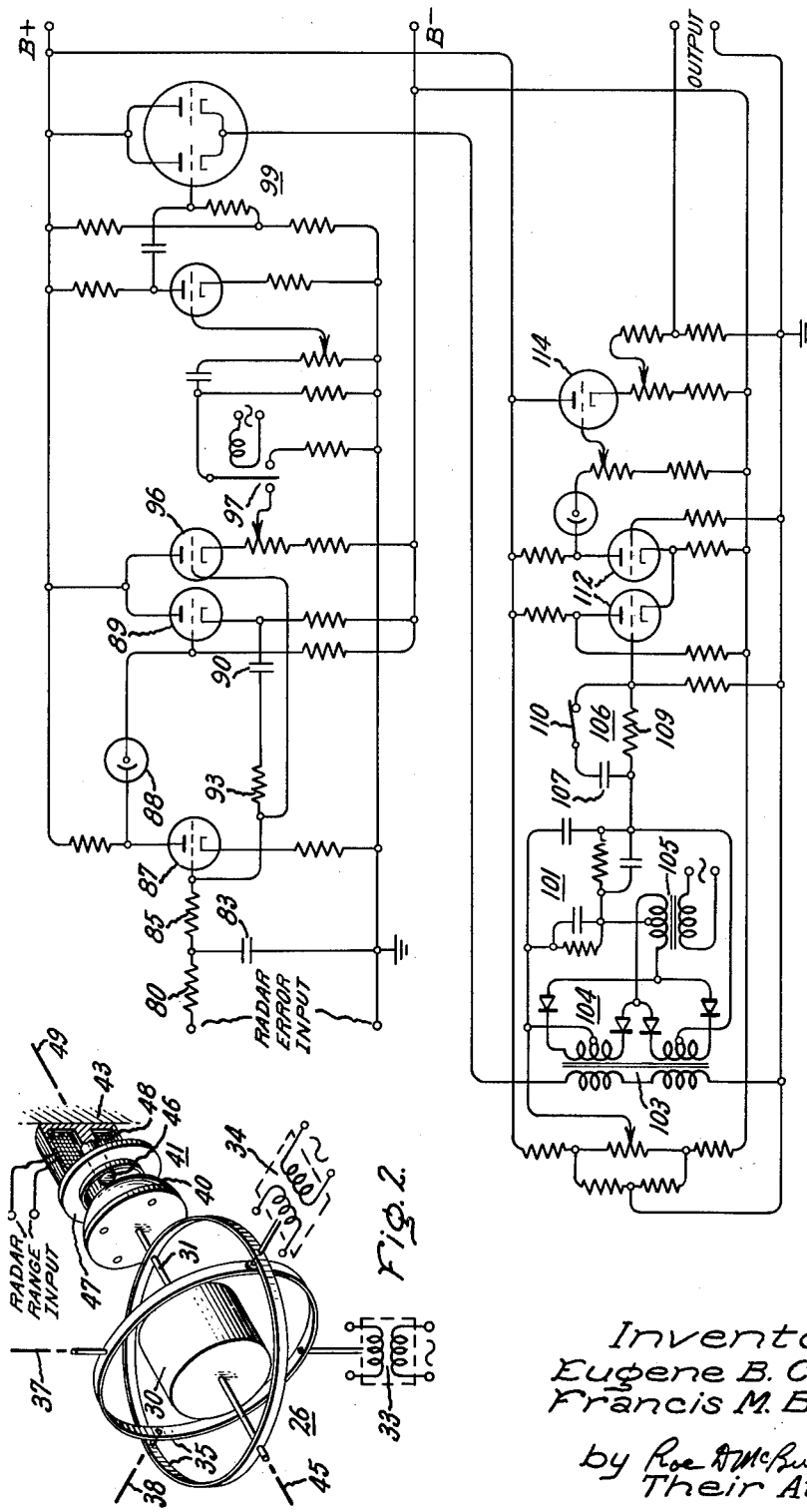

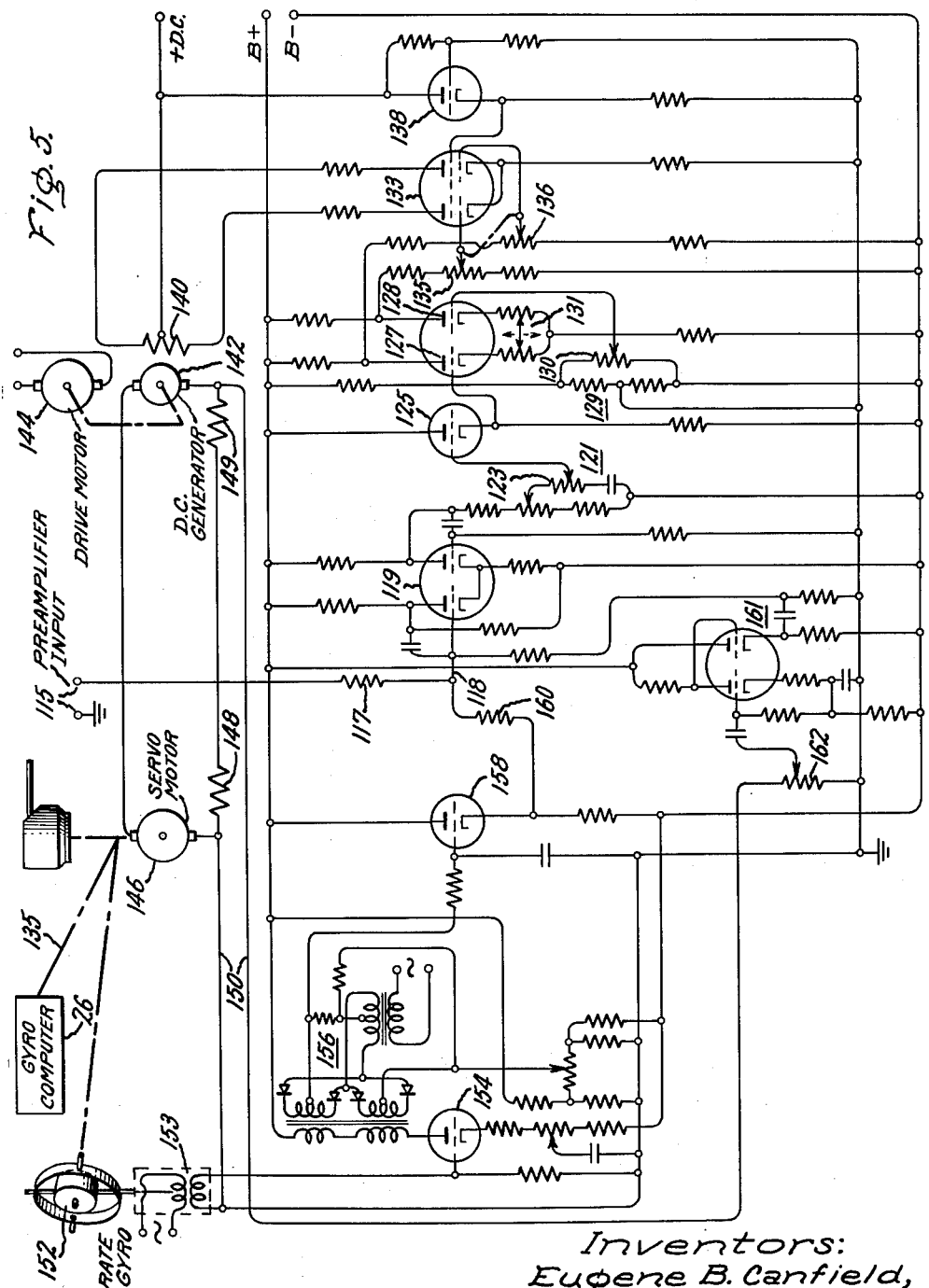

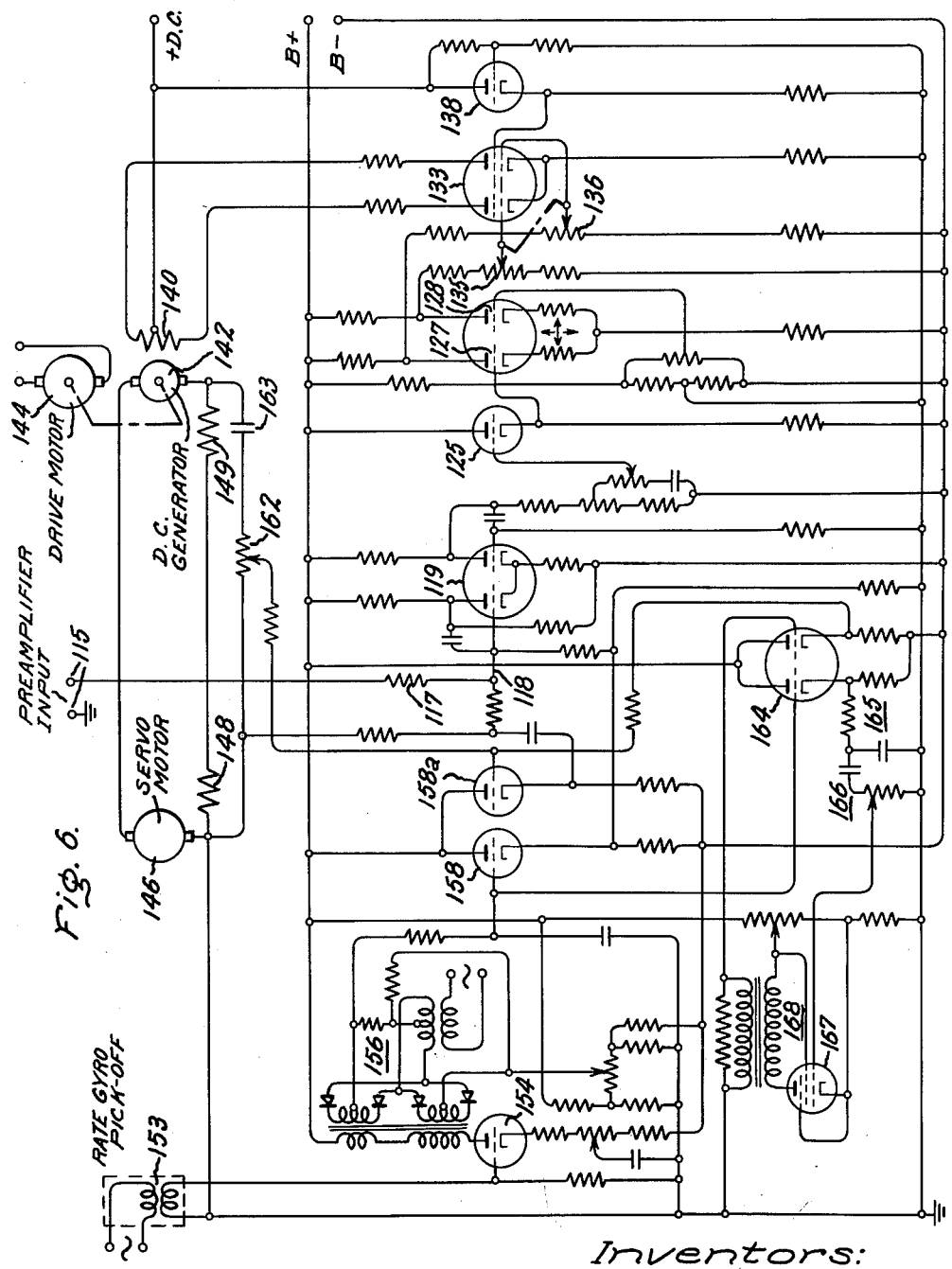

Inventors:
Eugene B. Canfield,
Francis M. Bailey,
by Roe D. McBurnett
Their Attorney.

United States Patent Office 3,019,711
Patented Feb. 6, 1962

3,019,711
CONTROL SYSTEMS FOR POSITIONING OBJECTS HAVING HIGH INERTIA
Francis M. Bailey, Scotia, N.Y., and Eugene B. Canfield, Pittsfield, Mass., assignors to General Electric Company, a corporation of New York
Filed Dec. 26, 1956, Ser. No. 630,700
13 Claims. (Cl. 89—41)

This invention relates generally to systems for automatically positioning guns and other high inertia loads, and more specifically it relates to control systems and components for positioning inertia loads wherein the control action is in accordance with position control data including as items thereof the displacement and/or velocity of the inertia load as measured by response elements connected for movement therewith.

In conventional control systems of the kind referred to, the prime mover drives its inertia load through a reduction gear train, and is energized responsive to positional input signals controlling its power supply. One or more position and/or velocity response elements are driven by the prime mover in synchronism with the load, either by being coupled directly to the load or by a direct or gear train connection to the prime mover. The feedback signals produced by these response elements are combined with the positional input signals in a manner to control the speed of the prime mover and cause it to stop when the misalignment of the load with respect to its indicated final position has been reduced to zero.

If in position control systems of this type the velocity and misalignment responsive elements are directly connected to and driven with the load, then the feedback signals provided by the response elements correctly reflect the velocity and position of the load relative to the required velocity and position thereof at any time. However, because of the backlash and resilience inherent in reduction gearing as normally used between the load and prime mover, the prime mover can execute displacements within the range permitted by the gearing backlash and resilience without corresponding movement of the load and therefore without movement of the response elements conected thereto. The result of such prime mover movement, without corresponding movement of the load and response elements, is the introduction of time lags in the response of the control system to movement of the prime mover. The response elements then will not operate exactly in phase with the prime mover and the resulting phase discrepancies between the control and response signals give rise to oscillation and hunting of the system.

The stiffness of control afforded by a positioning system may be defined as the force applied by the prime mover to its load for unit misalignment thereof. For most applications relatively high control stiffness obviously is very desirable, and relatively high response speed and high sensitivity are likewise definitely to be desired. However, increasing the system response speed, sensitivity and stiffness of control normally is effective to make the system even more sensitive to slight discrepancies in phase of the control and response signals, and thus aggravates the tendency to hunting and oscillation. Accordingly, it heretofore has been possible to avoid excessive hunting and wander only at the expense of such desired operating characteristics as good response speed and high control sensitivity and stiffness.

To avoid these undesirable results, it has previously been proposed to couple the response element or elements directly to the prime mover, rather than to the load, and if this is done the control system then positions the prime mover with good accuracy. In this arrangement, however, the accuracy with which load position as indicated by the response element corresponds with actual position is reduced by the amount of backlash in the gear train. Since the best available reduction gearing commonly may have one minute or more of backlash, it is apparent that optimum accuracy of load position control cannot be obtained in this manner.

In accordance with the invention, a prime mover constructed and arranged to provide suitable time constants and other performance characteristics when operative within a closed servo loop positions an inertia load through a direct coupling thereto, thus eliminating all reduction gearing and the adverse effects thereof on system performance just explained. Accordingly, the present invention has as its principal object the provision of control systems of the kind described characterized by freedom from hunting, oscillation and wander, and providing optimum system accuracy, sensitivity and response speed.

Another object of the invention is the provision of a position control system for an inertia load including a prime mover directly coupled to such load at 1-to-1 speed ratio therewith and energized by power drive means stabilized by control signals produced by position and/or velocity response elements driven with the load.

Still another object is the provision of a position control system for an inertia load wherein the load is directly connected at 1-to-1 speed ratio to a prime mover operative within a closed servo loop including one or more response elements driven with the load to produce feedback signals effectively stabilizing the system against external forces to which the load is subjected.

A further object of the invention is the provision of a low-speed electric motor having time constants and other characteristics adapting it to directly drive an inertia load at 1-to-1 speed ratio therewith in a closed loop servo system.

The disadvantages just enumerated as inherent in prior control systems have seriously detracted from system performance of conventional fire control apparatus and have proved even more troublesome in fire control systems of "disturbed sight" type.

Briefly, disturbed sight fire control systems differ from the conventional director type system in utilizing a simple gun-mounted gyro computer for determining target lead angle, instead of the usual off-mount computer and other associated elements necessary to director systems. In disturbed sight operation, the target error signal supplied by radar or other target finding apparatus mounted on or coupled to the gun directly controls the gun drive motor, causing it to move the gun and target finding apparatus in a direction to decrease target error. The gyro computer housing is fixed with respect to the gun for movement therewith, with the gyro's zero deflection axis being parallel to the gun line of fire and the gyro sensitive element biased toward zero deflection position by a force inversely related to target range. The two pick-off's on the gyro axes of freedom then provide output signals accurately indicative of the lead angles, in train and elevation respectively, necessary for the gun to score on target. These computer output signals energize the radar antenna positioning servo to drive the antenna with respect to gun position through the indicated lead angles.

Thus, as the gun is driven toward target position and carries with it the gyro computer housing and radar antenna mount, the gyro computer supplies a lead angle signal to the radar antenna servo. This servo then drives the radar antenna with respect to the gun to place the antenna directly on target and to place the gun off target by the computed lead angle.

Since the disturbed sight fire control system thus includes a computer within its closed loop, such systems are very prone to hunting and wander, and the reduced accuracy and reliability of disturbed sight fire control systems due to these causes has seriously detracted from desirability of their use. Accordingly, while fire control systems of this type offer many important advantages over the conventional director type systems, particularly in affording a very considerable saving in bulk and weight, as well as greater simplicity and lower cost, it has previously not been feasible to build and successfully operate fire control systems of this type.

Accordingly, a further object of the present invention is the provision, in a fire control system, of a gun position control system characterized by stability of operation and absence of hunting and wander despite the inclusion of computing networks therein.

It is also an object of the invention to provide a disturbed sight fire control system having relatively few components each of which is relatively small in size and weight, whereby the system is characterized by optimum simplicity of structure and economy of manufacture.

In carrying out the invention in one form, a prime mover of design enabling it to directly drive an inertia load at 1-to-1 speed therewith operates within a closed servo loop including a velocity and/or position response element driven with the load to produce a stabilizing feedback signal to the prime mover. Since the prime mover and its load are directly coupled with no reduction gear train or other mechanical movement between them, the backlash and resiliency inherent in such mechanical movements is completely obviated to thus permit increased sensitivity of control, provide improved frequency response and velocity constant, and at the same time effectively minimizes hunting and wander in the system.

In a preferred form of the invention as embodied in a fire control system, the system includes target finding apparatus which may be of radar or other type providing an output signal indicative of the direction and magnitude of target error, i.e., the discrepancy between the line of sight of the sighting device and actual target position. This error signal after amplification controls the operation of a prime mover which is directly coupled to the gun and also directly coupled to a gyro computer having its housing carried at gun order position. Responsive to gun movement, the gyro computer produces a signal providing a measure of target lead angle, which varies with the range, speed and direction of movement of the target. This lead angle signal controls the operation of a drive servo for the antenna or other sighting element of the target finding apparatus, to move the sighting element through the computed lead angle with respect to gun order position, thus placing the sighting element directly on target and the gun off target by the computed lead angle. Preferably, a gyroscopic element is used to provide velocity response for the gun drive motor, as such response element also will serve to stabilize the gun drive to the motion of the aircraft or naval vessel on which the gun is carried.

The invention will itself be more fully understood and its various objects, features and advantages further appreciated by reference to the appended claims and the following detailed specification when read in conjunction with the accompanying drawings, wherein:

FIG. 1 represents in block form a disturbed sight gun fire control system in accordance with the invention;

FIG. 2 illustrates diagrammatically the gyro computer element of the fire control system of FIG. 1;

FIG. 3 illustrates schematically a gun turret construction embodying the invention;

FIGS. 4, 5, 6 and 7 are circuit diagrams of a preamplifier, a power drive amplifier, an alternative form of power drive amplifier, and a lead angle servo amplifier, respectively, all suitable for use in the fire control system of FIG. 1;

FIG. 8 is a fragmentary view of an electric motor illustrating motor dimensions important to operation in accordance with the invention;

FIG. 9 is a fragmentary view of a modified form of direct drive electric motor adapted to use either as a gun or director drive motor;

Figure 10:
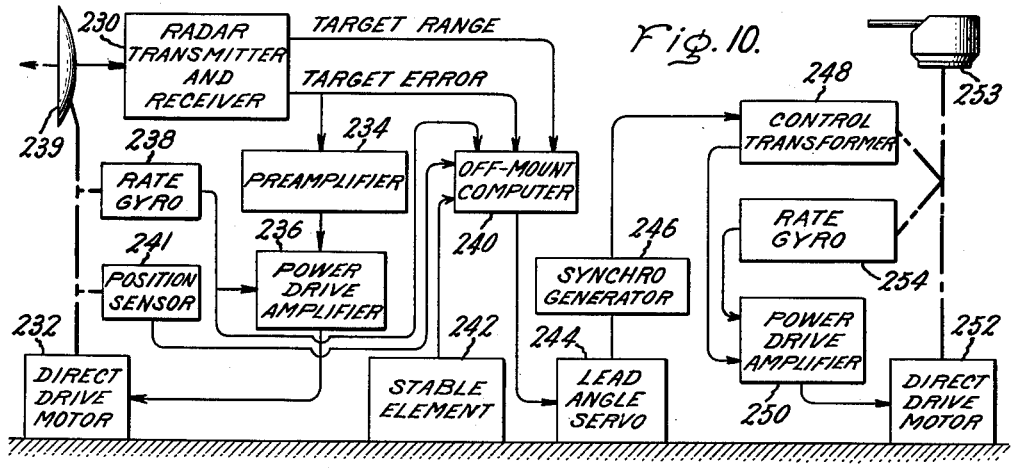
FIG. 10 is a block diagram of a director type fire control system.

With continued reference to the drawings, wherein like reference numerals have been used throughout to designate like elements, FIGURE 1 illustrates the invention as embodied in a disturbed sight fire control system in which the angular position of a gun 10 is controlled by a prime mover 12 directly connected to the gun as indicated diagrammatically by dotted line 14, so as to drive the gun at 1-to-1 speed ratio with respect to the prime mover. In the specific embodiment illustrated, operation of prime mover 12 is under control of a radar type target finding system which may be of conventional type including an antenna as indicated diagrammatically at 16. The associated radar transmitter and receiver equipment 18 produces target error signals and also a target range signal, the error signals being in the form of D.-C. voltages of polarity and magnitude providing an indication of the direction and extent of departure of the radar line of sight from the target, and the range signal providing an indication of the actual range of the target.

It will be understood that the radar equipment produces two target error signals, one being an indication of error in train and the other an indication of error in elevation. These separate error signals are supplied to separate train and elevation drive systems for the gun, as is the normal practice in conventional fire control systems. Since the train and elevation drive systems may be substantial duplicates of each other in general construction and in operation, only the train drive for the gun will be specifically described hereinafter.

*Train drive system*

The train error signal output from the radar tracking system 18 is fed to a preamplifier 20 which will be described hereinafter with particular reference to FIGURE 4. Preamplifier 20 produces a stabilized and greatly amplified D.-C. output signal, the polarity of which provides an indication of the direction of departure of the target from the line of sight of radar antenna 16, the magnitude of the output signal providing an indication of the extent of such departure. This D.-C. output signal from the preamplifier is supplied to and controls operation of a power drive amplifier 22 hereinafter particularly described with reference to FIGURES 5 and 6. Power drive amplifier 22 is directly connected to the gun drive motor 12 to control its operation and cause the gun to move in a direction and at a rate dependent on the direction and extent of departure of the target from the radar line of sight.

A velocity response element 24, which may take the form of a rate gyro directly connected as indicated by dotted line 25 to the gun drive unit, preferably by being mounted to the gun, provides velocity feedback for the gun drive. Where a rate gyro is used, it also acts to stabilize the drive to motion of the aircraft or naval vessel on which the system is carried. The rate gyro may be of any conventional type capable of providing an output signal which is in the form of, or convertible to the form of, an A.-C. voltage of phase and magnitude dependent respectively upon extent of precesion of the gyro in response to movement of the gun to which it is coupled.

*Gyro computer*

Also directly coupled to the gun drive is a gyro computer 26 which may be mounted on or otherwise coupled to the gun mount for movement therewith, as diagrammatically indicated by dotted line 28 in FIGURE 1. The structure and operation of gyro computer 26 is diagrammatically illustrated in FIGURE 2, wherein the gyro sensitive element 30 is shown mounted to a shaft 31, the axis 45 of which is the spin axis of the gyroscope.

This gyro computer 26 may be of the general type disclosed in U.S. Patent No. 2,467,831, issued April 19, 1949 to F. V. Johnson, with the gyroscope modified by addition of electrical pick-offs as diagrammatically shown at 33 and 34 in FIGURE 2. In this figure, the gyro sensitive element 30 is shown mounted within a conventional gimbal type suspension 35 which permits free movement of the gyro element both about a vertical axis 37 and about a horizontal axis 38. The pick-offs 33 and 34 each provide an electrical indication of the angular position of gyro element 30 with respect to one of these two axes of gyroscope freedom.

The gyro shaft 31 has fixedly mounted to one end thereof an eddy current disc 40 in the form of a segment of a sphere having its center on the center of suspension of gyro element 30; i.e., at the intersection of the vertical and horizontal axes of freedom 37 and 38. Positioned opposite the eddy current disc 40 is suitably shaped electromagnet 41 fixedly mounted to the adjacent wall 43 of the computer housing. The magnet 41 comprises a center pole 46 integrally formed with an outer annular pole 47, the magnet energizing coil 48 being wound between these poles as shown.

The magnet 41 is mounted to the computer casing 43 so that the longitudinal axis of the central pole piece 46 passes through the center of suspension of the gyroscope, and the lengths and shapes of the pole pieces 46 and 47 are such that their ends lie on a spherical surface having its center at the center of suspension of the gyroscope. The magnet 41 and eddy current disc 40 constitute a coupling between the gyroscope and the computer casing 43 which applies a torque to the gyroscope tending to precess it into alignment with the axis 49 of the magnet, which is the zero deflection axis.

Here it should be noted that the magnet is positioned so that its axis 49 and the zero deflection axis coincident therewith are exactly parallel to the gun axis, the computer casing 43 preferably being directly mounted to the gun so as to maintain this relationship.

It will be understood that, in operation of the magnetic coupling thus provided between the casing 43 and gyroscope, no eddy currents are induced in the eddy current disc 40 despite its rotation in the magnetic field set up by the magnet 41, whenever the spin axis of the gyroscope is exactly aligned with the axis of the magnet. However, if the axis of the disc departs from coincidence with the axis of the magnet, the motion of the disc under the magnet poles then causes eddy currents to flow in the disc 40. A resulting electromagnetic force acts on the gyroscope in a direction to precess it back into alignment with the magnet axis. The magnitude of this force varies approximately linearly with the angle between the axes of the gyroscope and magnet, and varies in like manner with the coefficient of magnetic coupling, which is a function of the magnet excitation current. This excitation current is the target range signal supplied by the radar or other target finding apparatus, the range signal being in the form of a D.-C. voltage of magnitude inversely related to target range as measured by the target finding apparatus.

Thus, the coupling between magnet 41 and eddy current disc 40 is made to vary inversely with target range and, as explained in greater detail in the aforesaid Johnson patent, the angular displacement of the gyro spin axis 45 with respect to the magnet or zero deflection axis 49 then represents the computed target lead angle. Displacement of these axes in the horizontal plane as indicated by the output signal from pick-off 33 constitutes an accurate measure of the lead angle in train necessary to be established between the gun axis and the target line of sight in order to make proper allowance for target movement and projectile time of flight. Similarly, displacement in the vertical plane is a measure of lead angle in elevation and is indicated by pick-off 34.

Pick-offs 33 and 34 may be of any conventional type producing an A.-C. output signal the phase and magnitude of which provide an accurate measure of the angular position of the gyro sensitive element 30 about its two axes of freedom. As illustrated, each pick-off may be in the form of a variable coupling transformer one winding of which is fixed and the other mounted for movement with the gyro. One of the two windings is supplied with an A.-C. exciting current, preferably taken from the power supply for the lead angle servo amplifier (FIG. 7), into which the output signal from the other pick-off winding is fed.

*Antenna train drive*

With reference again to FIGURE 1, the lead angle signal from gyro computer 26 acts through lead angle servo amplifier 50 to control operation of an antenna drive motor 52, which preferably is directly connected to the radar antenna 16 at 1–1 speed ratio therewith. Motor 52 is mounted on or otherwise coupled as indicated by dotted line 54 to the gun mount 10, so as to properly reference the antenna to the gun axis. Such referencing is necessary because lead angle is computed with respect to gun axis in the system as shown.

A tachometer generator 56 and variable coupling transformer 58, both of which may have their stationary elements fixed with respect to the antenna drive motor housing and their movable elements coupled to the motor shaft as indicated by dotted lines 60, provide rate and position response, respectively, for the antenna drive as more specifically described hereinafter with particular reference to FIGURE 7. Variable coupling transformer 58 preferably has its movable element directly connected to the shaft of motor 52; the tachometer generator may have a gear train connection thereto if necessary for satisfactory operation of the generator. The presence of a gear train here is not appreciably detrimental to stability of the system because the tachometer generator is not an inertia load and there is no computer network included in the antenna drive servo loop closed through the tachometer generator.

In operation, the error signal from the radar target finding system acts through the preamplifier and power drive amplifier of the gun drive so as to cause the gun to rotate in a direction to reduce radar error and follow target movement. As the gun moves, it carries with it the radar antenna 16, thus reducing the radar error signal output. Simultaneously, the gyro computer carried by the gun produces a lead angle signal the phase and magnitude of which are dependent on the rate of movement of the gun and on the range information supplied the gyro computer by the radar. Responsive to this signal from the gyro computer, the radar drive motor is energized and drives radar antenna 16 through the computed lead angle, so as to place the radar line of sight directly on target when the gun axis is displaced from such line of sight by the computed lead angle. Velocity response for the gun drive is provided by the rate gyro and position response is provided by the entire control loop including the radar and gyro computer.

Since in the fire control system just described the gyro computer is mounted so as to measure rates directly in both train and elevation planes, the servos and other components normally used to obtain this information may be eliminated. Also, no stable elements and axis converter are required because the computer housing always is at gun order position and its lead angle output is transmitted directly to the antenna drive, which also is referenced to gun order position. The gyro computer thus offers a simple means for solving for the target lead angle without the use of stable elements.

Turret construction

FIGURE 3 illustrates the disturbed sight fire control system of FIGURE 1 as embodied in a gun turret of naval type. As shown, the gun turret 61 is rotatably mounted to a barbette or base 62 which is fixed to the deck of the vessel and houses within it the gun drive motor (not shown in FIGURE 2), this motor being directly coupled to the turret so as to drive it in train at 1-to-1 speed ratio with respect to the motor. The drive motor preferably is of the general type illustrated in FIGURE 8 and described hereinafter with reference to that figure.

Turret 61 mounts the usual single or twin gun (twin guns 64 and 65 are shown), with the guns being positioned in train by rotation of the entire turret and positioned in elevation by rotation of the guns on suitable mounting structure 66 diagrammatically shown within the turret. The necessary train and elevation rate gyros may be housed within a casing 67 directly mounted to one of the gun trunnions or other gun part which moves in both train and elevation with the guns. A gyro computer enclosed within casing 68 as shown in FIGURE 3 is similarly mounted for movement with the guns in train and elevation. Since the rate gyros and gyro computer sense movement in elevation as well as in train, and the turret itself does not move in elevation, it is necessary to couple the gyro and computer casings to the guns in some way to assure simultaneous movement therewith.

Turret 61 also mounts a radar drive motor 69 which as shown is directly coupled to radar antenna 71 for positioning the antenna in train. The shaft 72 of motor 69 extends through a tachometer generator 73 and variable transformer 74, which are directly mounted to the motor as shown and have their movable elements coupled either directly or through a gear train to the motor shaft. Suitable means such as the drive motor 77 illustrated may be provided for positioning the radar antenna in elevation. Since as noted above the control system for this elevation drive is similar in operation to the train drive it will not be further described herein.

The radar transmitter and receiver, the power drive amplifier and preamplifier, and the lead angle servo amplifier may either be housed in an equipment cabinet (not shown) carried on the gun or, if preferred, this equipment may be disposed in an off-mount cabinet and the necessary electrical connections made to the gun turret through suitable slip rings or like connections.

Preamplifier

Turning now to FIGURES 4, 5, 6 and 7, suitable circuits for the preamplifier, power drive amplifier and lead angle servo amplifier are diagrammatically shown. Referring first to FIGURE 4, the input signal to the preamplifier circuit of this figure is constituted by the radar error signal, which preferably is in the form of a D.-C. voltage of polarity and magnitude dependent respectively on the direction and magnitude of radar error; that is to say, on the direction and extent of departure of the radar line of sight from the actual target position in the traverse plane.

The function of preamplifier 20 is to modify the radar error signal in a manner both to smooth the signal and also to stabilize the entire radar tracking loop by introduction of suitable time constants to the control signals. To these ends, the preamplifier at its input is provided with a small smoothing filter consisting of resistor 80 and capacitor 83 connected as shown. The smoothed signal is fed to a lead-lag filter network comprising a resistor 85, a first triode 87, a voltage regulator 88 and a second triode 89. Also included in this network is a large capacitor 90, preferably of the order of 14 mfd., and a resistor 93 which may be of the order of several hundred thousand ohms, for example.

The lead-lag filter network just described makes use of the well known "Miller effect" to increase the effective value of capacitor 90 to several times its actual value. For example, with a 14 mfd. capacitor as mentioned the effective capacitance may be increased to about 100 mfd. The large capacitance thus provided effectively is connected across the grid and plate of triode 87, and acts to modify the radar error signal by introducing therein a phase shift and amplitude change, both of magnitude dependent on the value of capacitor 90 and resistors 85 and 93.

The radar error signal thus modified is taken from the grid of triode 87 and impressed on the grid of another triode 96 which as shown is connected for cathode follower operation in conventional manner. The signal next is converted to A.-C. by a converter 97 driven by the main A.-C. power supply, and then is amplified in a two-stage A.-C. amplifier 99 which may be of conventional type as shown.

The output signal from A.-C. amplifier 99 is fed to a phase-sensitive rectifier circuit 101 including a transformer 103 across the primary of which the A.-C. amplifier output signal is impressed. The center tapped secondary of transformer 103 applies its output voltage across a rectifier bridge 104 biased by an A.-C. potential derived from a second transformer 105, the primary of which is driven by the same A.-C. power supply as converter 97. The rectifier bridge output, which is a D.-C. voltage of polarity and magnitude dependent on the phase and magnitude of the A.-C. input signal, is fed through a lead-lag filter 106 comprising a capacitor 107 and resistance 109, a switch 110 being provided for removing the capacitance 107 from circuit when desired.

As will become apparent hereinafter, the preamplifier circuit of FIGURE 4 is adapted for use both in disturbed sight fire control systems and in director type systems. For disturbed sight operation, switch 110 is closed to include capacitance 107 in the lead-lag filter network. For conventional director type tracking as hereinafter explained, the capacitance 107 is removed from circuit by opening switch 110, to thus compensate the difference in time constants required in the two fire control systems.

The error signal as modified by lead-lag filter 106 is amplified by triodes 112 operating as a long tail pair, and then impressed on the grid of a triode 114 connected for cathode follower operation as shown. The preamplifier output signal is taken from this cathode follower and fed to a power drive amplifier as shown in FIGURE 5 or FIGURE 6.

Power drive amplifier

In FIGURE 5, the input signal applied across the preamplifier input terminals 115 is fed through a resistor 117 and lead 118 to one grid of a twin triode 119, the two halves of which are connected for operation as a long tail pair as shown. The amplified signal next is filtered in a resistance-capacitance network 121 including a potentiometer 123 which may be adjusted to control the time constant of the network. A cathode follower 125 couples the smoothed signal output of filter network 121 to the grid of a triode 127.

Triode 127 may as shown be one half of a twin triode, with the other triode 128 having its grid connected into a grid biasing resistance network 129 including a potentiometer 130 which is adjustable to balance the outputs of the two triodes 127 and 128 under zero signal input conditions. The cathode bias network for triodes 127 and 128 preferably includes adjustable resistance means 131 as shown for simultaneously adjusting the gain of both triodes.

The output of each triode 127 and 128 is impressed on one grid of a power output tube 133, through one of a pair of potentiometers 135 and 136 the adjustable contacts of which are mechanically interconnected so as to be simultaneously adjustable to control the output levels of the two halves of the power tube. Screen grid bias for power output tube 133 is provided by a cathode follower 138 which serves to compensate for variations in voltage of the main D.-C. power supply.

When there is no error signal supplied to the power drive amplifier of FIGURE 5, each plate of power output tube 133 conducts an equal amount of current into the split field winding 140 of a D.-C. generator 142, which is driven at constant speed by any suitable drive motor such as the electric motor 144 shown. When an error signal exists, the plate currents in the two halves of output tube 133 then are unequal and a resultant field flux is produced in the generator 142. Since the generator is driven at constant speed, the polarity and magnitude of its D.-C. output voltage are dependent on the direction and extent of energization of its split field winding 140, and as just explained this is dependent on the direction and extent of unbalance of the power output of the two halves of power tube 133.

The D.-C. voltage output of generator 142 is applied directly to a servo motor 146 which constitutes the drive motor for the gun or other inertia load and is directly coupled thereto at 1-to-1 speed ratio. Included in this generator motor circuit are compensating field coils 148 and 149 for the motor and generator, respectively, across which a current feedback signal is taken by leads 150, for a purpose later to be explained.

Velocity response for the gun drive servo is provided by a rate gyroscope 152 which as hereinbefore described also serves to stabilize the drive to any motion of the platform on which the control system is carried. The rate gyro, only schematically shown in FIGURE 5, may be of conventional type provided with an electrical pick-off 153 producing an A.-C. output signal of phase and magnitude dependent on the displacement of the gyro spin axis from its zero deflection or centered position, to which the gyro element is normally biased by suitable electromagnetic, spring restraint or other centering means.

The rate gyro 152 measures the direction and speed of rotation of motor 146 and its load, and feeds into the power drive amplifier an A.-C. control signal indicative of the measured velocity. This A.-C. signal is amplified by a triode 154 and the amplified signal fed to a phase-sensitive rectifier bridge 156, which is similar in construction and operation to the rectifier bridge 101 in the preamplifier circuit described above. The signal thus rectified and discriminated is coupled through a cathode follower 158 and resistor 160 to the lead 118 carrying the preamplifier input signal.

As noted above, current feed-back from the generator and servo motor compensating field circuit is used for stabilizing the servo drive. This feedback signal is taken by leads 150 connected across the compensating field coils and amplified in a D.-C. amplifier stage 161, the output signal from which is mixed with the preamplifier input and rate gyro response signals as carried by lead 118. Current feedback thus obtained may be varied by adjusting a potentiometer 162 included in the feedback circuit to obtain optimum stabilization of the servo drive circuit.

The rate gyro and current feedback signals as modified and ultimately impressed on lead 118 normally are both of opposite polarity to the preamplifier output signal which is also impressed on this lead, so that the feedback signals normally tend to reduce or cancel the radar error signal supplied through the preamplifier. By means of the various gain controls provided, the relative amplitudes of the three signals may be adjusted to enable the rate gyro and current feedback signals to properly perform their intended function of limiting the maximum current and speed of output servo motor 146, and also to enable the rate gyro to introduce stabilizing signals properly compensating for roll, pitch and other motion of the platform on which the system is carried.

In a servo system having no reduction gearing between the servo output motor and its load, the absence of reduction gearing and its characteristic inertia, friction and force multiplication normally would tend to make the system more susceptible to error movements responsive to externally applied forces such, for example, as wind loads on an antenna positioned by the servo. In the servo systems of the invention no such objectionable sensitivity to externally applied forces is perceptible because the effects thereof normally are fully compensated by the increased response speed and higher control signal sensitivity characteristic of these novel systems. Where unusually high external forces are involved, however, use of the modified form of power drive amplifier illustrated in FIGURE 6 may further improve system operation. This modified amplifier also presents advantages in reducing roll reversal error and minimizing slot effect as hereinafter explained.

The power drive amplifier of FIGURE 6 differs from that of FIGURE 5 primarily in substituting for the simple current feedback of FIGURE 5 a combined current and differentiated rate feedback, the current and differentiated rate signals being combined in a manner such that the differentiated rate feedback predominates at low signal frequencies while current feedback assumes predominance at higher frequencies. As shown in FIGURE 6, current feedback from the generator-servomotor circuit is taken across the motor and generator field coils 148 and 149 by means of a potentiometer 162 which, together with a capacitor 163 connected in series relation therewith, also forms a lead filter having a time constant corresponding to the adding frequency of the differentiated rate and current feedback signals. The current feedback signal thus filtered is combined with a differentiated rate signal obtained by electrically differentiating the output signal from rate gyro pick-off 153, after conversion thereof in the rectifier network 156.

This rate signal is applied to one grid of a twin triode 164 which is connected for cathode follower operation and supplies its output signal to a lag filter 165 having a time constant corresponding to the aforementioned adding frequency. The rate signal thus filtered is fed through an isolation filter 166 to the control grid of a pentode amplifier 167 the signal output of which is impressed across the primary winding of a transformer 168. This transformer operates well below the knee of its saturation curve and accordingly is effective to differentiate the applied signal in well known manner. The transformer output thus differentiated is applied to the other grid of twin triode 164 which produces a D.-C. output signal of polarity and magnitude dependent on the sign and magnitude of the differential of the rate gyro output. This D.-C. signal is combined with the current feedback signal and the combined signal then is impressed on the grid of a triode 158a connected for cathode follower operation. The output signal from this triode is capacitor coupled by means of a lead network to lead 118 and there combined with the preamplifier input signal and rate signal supplied by triode 158.

In operation, the use of differentiated rate (i.e., acceleration) feedback in conjunction with current feedback is effective to substantially reduce system sensitivity to externally applied forces such as wind loads. At the same time, roll reversal error and slot effect sometimes experienced where motor-generator current feedback at low frequencies is used is substantially reduced or eliminated, since both such errors are manifested as low frequency fluctuations in motor-generator current and here the current feedback signal becomes controlling only at higher frequencies, the differentiated rate feedback signal alone being controlling below the adding frequency.

*Lead angle servo amplifier*

The input to the lead angle servo amplifier and antenna drive of FIGURE 7 is from an electrical pick-off 34 on the traverse axis of the gyro computer, as explained above with reference to FIGURE 2. The input coil 169 of this pick-off is energized by a constant amplitude A.-C. signal obtained from the same A.-C. power supply as used to power the preamplifier and power drive amplifier of FIGURES 4-6. The pick-off output coil 170 is connected in series with the output coil of a variable coupling transformer 171, the input to which also is a constant amplitude A.-C. signal from this common A.-C. power supply.

The variable transformer 171 is mechanically coupled to and driven by the antenna drive servo 172, and provides position response for the antenna drive. Since the input signals to the gyro computer pick-off and the variable coupling transformer are of like amplitude and phase relation, there is no current flow in the circuit at times when the two output coils are correspondingly positioned with respect to their respective input coils, because the signals generated in the two output coils are equal and opposed. If, however, the output coil in the gyro computer pick-off and the output coil of the variable coupling transformer are not precisely correspondingly positioned with respect to their respective input coils, then there will be a difference between the signals generated in the two output coils and the signals will not cancel. The resultant error signal, which is in the form of an A.-C. signal of phase and magnitude respectively dependent on the direction and extent of misalignment, is fed to the primary of a transformer 174 connected in series relation with the variable transformer and computer pick-off coils.

Transformer 174 forms part of a phase sensitive rectifier network 176 which is similar to those described in the foregoing with reference to FIGS. 4 and 5. As in the rectifier networks already described, the network 176 of FIGURE 7 converts the A.-C. error input signal into a D.-C. signal of polarity dependent on the phase of the A.-C. input as referenced to the main A.-C. supply, and of magnitude dependent on the magnitude of the A.-C. input.

The D.-C. error signal from rectifier circuit 176 next is amplified in a long tail pair stage comprising a twin triode 178, and then is further amplified in another such stage including a second twin triode 180. The plate of each half of triode 180 is connected to the grid of an output tube 182, which as shown is a twin tetrode having each of its plates connected to a D.-C. power supply (not shown) through one side of the split winding 184 of a D.-C. generator 186. This generator is driven at constant speed by a motor 188, and its output is connected to drive the radar antenna servo motor 172 in a direction and at a rate dependent on the phase and magnitude of the error signal fed into the servo amplifier circuit by the gyro computer and variable transformer 171.

For purposes of stabilizing the servo, both current and velocity feedback preferably are provided. As shown, a resistor 190 connected in the generator-servo motor loop provides a measure of generator current output. The current feedback signal from resistor 190 is impressed across a potentiometer 192 which is adjustable to vary the gain of the feedback signal. Velocity feedback is provided by a tachometer generator 194 or other velocity response element driven by the output servo motor 172. The velocity response element produces a feedback signal which is in the form of or is convertible to the form of a D.-C. voltage of polarity and amplitude dependent on the direction and rate of rotation of the servo motor. The gain of the tachometer feedback signals may be adjusted by means of a potentiometer 196. Preferably, lead filter networks including capacitors 197 and 198, and resistors 199 and 200, are provided to eliminate feedback in low frequency regions where feedback is not required for maintaining stability of the servo system.

In operation of the radar drive, any discrepancy between the relative positions of the pick-off coils 169 and 170 in the gyro computer and those of the coils of variable transformer 171 will give rise to A.-C. error signal of phase and amplitude dependent respectively on the direction and extent of such discrepancy. The amplifier circuit rectifies and amplifies this error signal to energize generator 186 and drive the output servo motor 172 in a direction and at a rate depending on the nature of the error signal, and in a direction to null the error signal. The current and tachometer feedback signals combine with the error signal in a manner to stabilize the servo against oscillation and wander.

*Drive motor construction*

One of the motor parameters commonly given careful consideration in design of motors for servo applications is the motor $D^2L$ per horsepower, "D" being the outside diameter of the motor armature (air gap diameter) and "L" the armature stack length. The common practice in designing conventional servo systems is to minimize the motor $D^2L$, since normally the smaller the value thereof the smaller will be the inertial time constant. Since low speed motors necessarily must have a relatively large $D^2L$ per horsepower in order to obtain the torque characteristics required for direct drive, it would be expected that direct drive systems would have an undesirably high inertial time constant and this apparently is the principal reason such systems have not heretofore found use in servo applications.

We have found that despite this servo design maxim the large $D^2L$ which is characteristic of slow speed motors not only does not preclude their use in closed loop servo systems, but that system performance and time constants may actually be improved by selecting a motor $D^2L$-to-horsepower ratio even higher than the minimum necessary to meet the motor torque requirements specified for the application. In accordance with the invention, the motor $D^2L$-to-horsepower ratio is made not less than about 2 thousand inches cubed per horsepower and may be as high as 20,000 in.$^3$/H.P. or even higher, where motor horsepower is calculated on the basis of continuous duty torque rating at duty cycle speed.

While it is not entirely clear why satisfactory time constants may thus unexpectedly be obtained by selecting such unusually high rotor $D^2L$-to-horsepower ratio, one possible explanation may be developed by reference to the equations expressing the various time constants involved. The time constants of particular significance in servo design are the inertial time constant of the motor itself and of the motor-load combination, and the inductive time constant of the motor and its power supply. The inertial time constants, which are the more critical to satisfactory performance, are given by the expressions:

$$T_s = \frac{T_m}{J_m}\left(\frac{J_d}{n^2} + J_m\right) \tag{1}$$

$$T_m = \frac{J_m R}{K_v K_t} \tag{2}$$

Where:

$T_s$ = inertial time constant of motor-load combination
$T_m$ = inertial time constant of motor
$J_m$ = motor inertia
$J_d$ = load inertia
$n$ = motor gear ratio $$R = \text{motor armature resistance} = k_1 \frac{zM}{a^2 A}$$

$$K_v = \text{motor generated voltage constant} = k_2 \frac{zDLB}{a}$$

$$K_t = \text{motor torque constant} = k_3 \frac{zDLB}{a}$$

$z$ = number of armature conductors
$M$ = armature mean length of turn
$a$ = number of armature circuits
$A$ = conductor cross-section area
$B$ = air gap flux density and $k_1$, $k_2$ and $k_3$ are design constants which normally do not vary widely from machine to machine.

Equations 1 and 2 may be combined and arranged as follows:

$$T_s = \frac{k_1}{k_2 k_3} \cdot \frac{M}{L} \cdot \frac{1}{zA} \cdot \frac{1}{B^2} \cdot \frac{1}{D^2L}\left(\frac{J_d}{n^2} + J_m\right) \quad (3)$$

Where, as in direct drive systems, $n=1$, then:

$$T_s = \frac{k_1}{k_2 k_3} \cdot \frac{M}{L} \cdot \frac{1}{zA} \cdot \frac{1}{B^2} \cdot \frac{1}{D^2L}(J_d + J_m) \quad (4)$$

The inductive time constant involves not only design parameters of the motor but also those of the generator, amplidyne or other power supply; hence it cannot readily be expressed in simple terms. Suffice it to point out here that one of the factors with which the inductive time varies directly is the product $zA$, which is the total cross-sectional area of the armature conductors.

In conventional gear drive motors the motor inertia $J_m$ normally is larger or at least of the same order of magnitude as the load inertia $J_d$ as referred to motor shaft speed through the reduction gearing; that is to say, the term $J_m$ in Equation 3 normally is at least of the same order of magnitude as the term $j_d/n^2$. Accordingly, it is believed apparent from Equation 3 that any increase in $D^2L$ with consequent increase in motor inertia $J_m$ in a geared system normally will be accompanied by a corresponding increase in the system inertial time constant $T_s$. This adverse effect on system time constant with increasing $D^2L$ is particularly pronounced in conventional gear drive motors because the rotors thereof usually are of substantially solid construction, and rotor inertia therefore increases as a function of $D^3$ or $D^4$.

In the direct drive systems of the invention, on the other hand, Equation 4 is applicable and the term $J_d$ therein is much larger than the term $J_m$, the load inertia $J_d$ normally being at least ten times that the motor inertia $J_m$ and often 100 or more times the motor inertia. Accordingly, the net effect of an increase in the term $D^2L$ in Equation 4 will be a reduction in the system time constant $T_s$, in direct contradistinction to the result which follows from increasing rotor $D^2L$ in conventional systems. Moreover, the rotors of motors for direct drive use in accordance with the invention preferably are in the form of a hollow annulus or ring, rather than in the form of a solid cylinder. Therefore, rotor inertia does not increase as the third or fourth power of rotor diameter as in conventional motors, but rather increases approximately as the second power. Thus the term $J_m$ in a direct drive system does not increase as rapidly with increasing $D^2L$ as it does in a geared system. This, coupled with the fact that in direct drive systems the term $J_m$ always is small as compared to $J_d$, permits optimizing the system time constant by use of a rotor having a $D^2L$-to-horsepower ratio higher even than necessary to obtain the desired power output.

With a motor having a $D^2L$-to-horsepower ratio within the range specified above and directly driving an inertia load, it is readily possible to obtain system inertial time constant $T_s$ of less than 1 sec. and, in most cases, of less than 0.5 sec. While such time constant values may exceed those obtainable in the corresponding gear drive systems, they are well within workable limits and the many benefits which follow from absence of gearing backlash and resilience as hereinbefore explained far more than outweigh the disadvantage of slightly higher system inertial time constant. The inertial time constant $T_m$ of the direct drive motor alone normally is of the order of .010 sec. and preferably less than .005 sec., which corresponds favorably with motor inertial time constants commonly found in gear drive systems.

It might be mentioned that one apparent way of improving system time constant in either a geared or direct drive system would be by increasing the term $zA$ in Equations 3 or 4, which term represents the total cross-sectional area of the armature conductors. Unfortunately, however, the inductive time constant increases with increase in conductor cross-section, and since performance of the system may be measured in terms of the product of the inertial and inductive time constants, little reduction in effective system time constant is obtainable by such change in conductor cross-section.

FIGURE 8 illustrates schematically a D.C. electric motor having a field 201 and armature 202 with the latter having its $D^2L$ proportioned as just explained to permit direct drive of an inertia load in accordance with the invention.

The motor illustrated is of wound field type but may instead have a permanent magnet field if desired. In either case, the field should have as high flux density as possible since maximum flux density improves both motor torque output and motor time constants. The field may or may not include compensating poles as preferred.

Preferably the motor includes a relatively large number of field poles and relatively high ratio of armature slots to field poles, 8 to 100 field poles with armature slot to field pole ratios of approximately 10-to-1 being typical in motors constructed in accordance with the invention. With such number of field poles the motor may have the low time constants desirable for optimum gain and speed of response when directly driving an inertia load. This field pole and armature slot relationship also is of advantage in that it helps to minimize slot effect in the rotor.

Slot effect may be further minimized by selecting a number of slots which is not equal to an exact multiple of the number of field poles. For example, in a motor having 32 poles the armature might have 319 or 321 slots, rather than 320, so that no two of the slots ever are precisely similarly aligned with the motor field poles. The armature slots may if desired be skewed in order to further reduce slot effect, though this generally is not necessary to satisfactory performance.

The armature preferably is wave wound in either retrogressive or progressive wave fashion and, to obtain the low speed rating desirable for direct drive use (30 r.p.m. or less), the motor normally will include a relatively large number of armature conductors connected to form only two parallel circuits. Armature slot depth to width ratio preferably is relatively large, the armature slots being made deep to accommodate the necessary large number of conductors per inch of armature circumference. For the reasons previously explained, the armature preferably is of hollow construction as shown.

*Integrated barbette and motor*

As noted above in the description of FIGURE 3, the D.-C. drive motor for turret 61 may conveniently be mounted within the gun barbette 62. FIGURE 9 illustrates schematically a suitable structure combining the gun barbette and direct drive motor in a unitary assembly in which the barbette also serves as the field yoke for the drive motor. As shown, the motor poles 203 are recessed in barbette 62 and provided with field coils 204. The motor armature 205 is carried by the gun turntable 207 and may be keyed thereto as by a key 209 for transmitting armature torque to the gun mount. Turntable 207 supports the turret housing 211 and is itself supported for rotation on barbette 62 by a bearing assembly comprising thrust rollers 213 carried in a thrust roller path 215. A radial bearing ring 217 of ball-bearing type is provided for absorbing radial forces and limiting side play of the armature. Since the motor shown is of axial air gap type, however, side play between the motor elements does not significantly affect motor performance and the radial thrust bearing assembly 217 therefore need not be such as to prevent all side play.

The motor armature 205 is provided with a plurality of slots through which the armature coils 219 are wound, the coils 219 being energized through any suitable commutation system. As shown this system includes a commutator ring 221 insulated from the armature as by an interposed annulus 223 of insulating material. Two or more brushes 225, only one of which is shown in FIGURE 9, provide the necessary electrical connection of energizing current to the commutator ring.

The electrical design of the motor and its $D^2L$-to-horsepower ratio should be in conformance with the design criteria explained hereinbefore with reference to FIGURE 8. Since the motor of FIGURE 9 is of axial air gap type, however, rotor stack length (L) is to be measured radially of the rotor rather than axially thereof as in the more conventional radial gap motor construction.

Director systems

Figure 11:
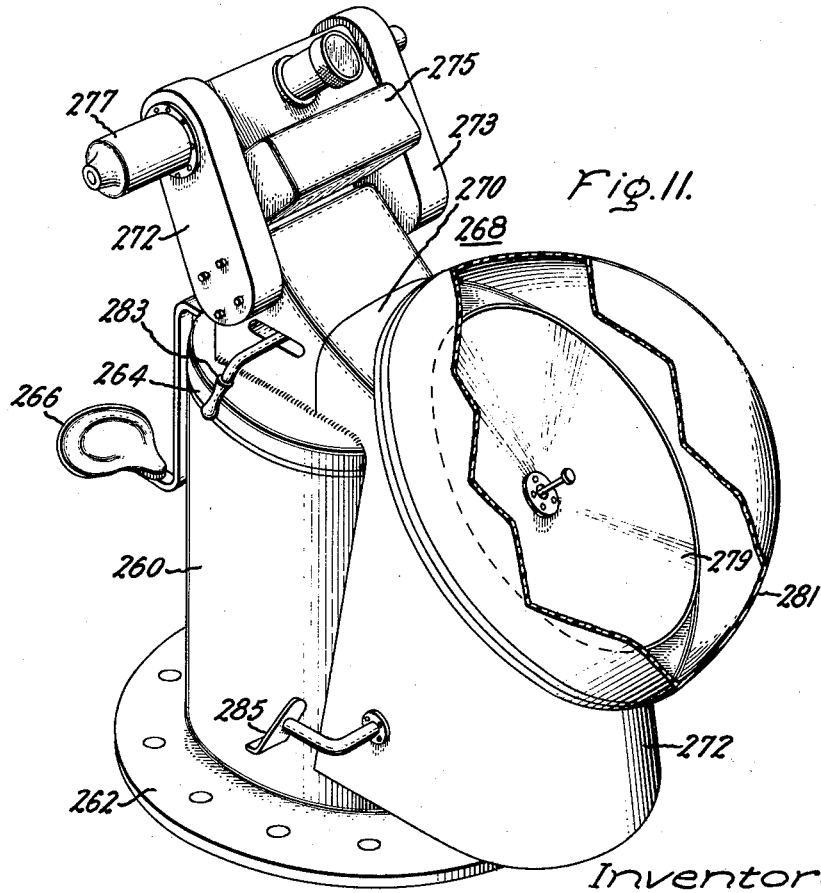
FIG. 11 is a perspective view of one form of fire control director unit embodying the control system of FIG. 10.

As pointed out in the foregoing, the control systems of the invention are not limited to use in fire control systems of disturbed sight type. FIGURE 10 illustrates the invention as applied to a fire control system of conventional director type, and FIGURE 11 illustrates a director unit adapted to use in the fire control system of FIGURE 10.

In FIGURE 10, the target error signal output from the radar tracking system 230 directly controls the radar antenna drive motor 232 through a preamplifier 234 and power drive amplifier 236 which may have the circuitry shown in FIGURE 4 and in FIGURE 5 or 6, respectively. A rate gyro 238 provides the necessary velocity response for the antenna drive system, position response being provided by the change in radar error signal output which is attendant on movement of the radar antenna 239 by its drive motor.

Target lead angle is computed by an off-mount computer 240 which may be of conventional type capable of determining lead angle and gun order on the basis of the target error and range signals provided by radar tracking system 230, director position and rate signals supplied by director position sensing means 241 and rate gyro 238, respectively, and compensating signals provided by a stable element 242 for stabilizing the system to movement of the platform on which it is carried. The target lead angle signal as supplied by computer 240 is fed to a lead angle servo 244 which drives the rotor of a synchro generator 246 to gun order position. This synchro generator is connected as shown to control operation of the gun drive through a control transformer 248, which provides an output signal to the power drive amplifier 250 for energizing the gun drive motor 252. Amplifier 250 may have the circuitry shown in FIGURE 7, and drive motor 252 may if desired be similar to that illustrated in FIGURE 9 and be similarly incorporated in the gun turret 253. Velocity feedback for the gun drive is provided by a rate gyro 254, and position response is provided by a control transformer 248, both of which are suitably coupled to the drive motor 252.

Since both the director and gun drive systems in the fire control system of FIGURE 10 are closed loop systems, the problems of instability, hunting and wander of the systems would seriously impair maximum sensitivity and speed of response, were conventional gear-train drives used. In accordance with the invention, however, direct drive of the load at 1-to-1 speed ratio with respect to the drive motor effectively minimizes hunting and wander even when operating with relatively high response speed and sensitivity, and at the same time affords improved reliability and economy due to greater simplicity of structure.

Director unit

This simplicity of structure is well illustrated in the director unit of FIGURE 11. As shown, a complete one-man director particularly adapted to naval fire control use may comprise a train drive motor 260 fixedly mounted to the ship's deck as by a mounting flange 262. The armature (not shown) of motor 260 has directly mounted to the upper end thereof a turntable 264 which carries a seat 266 for the operator and a radar and optical finder assembly designated generally by reference numeral 268 in FIGURE 11. This assembly includes a housing 270 having a depending portion 272 which may house the radar transmitter and receiver or other allied equipment. Mounted to the upper portion of housing 270, as by a pair of standards 272 and 273 rigidly fixed to housing 270 at their lower ends, is an optical finder assembly 275. This assembly 275 is pivotally mounted to standards 272 and 273 for rotation about a horizontal axis by an elevation drive motor 277, the assembly 275 being mounted on or directly coupled to the shaft of motor 277 for movement at 1-to-1 speed ratio therewith.

Rate gyros (not shown in FIGURE 11) may be mounted within assembly 275 to provide the necessary velocity response for the train and elevation drive systems, and also to remove ship's roll. Where separate rate gyros are used for the elevation and train drives, however, only the elevation rate gyro need be mounted within assembly 275 since only this gyro need move in elevation.

A radar antenna 279 enclosed within a radome 281 is mounted to the director housing 270 in a manner permitting the antenna free movement in elevation, i.e., in a substantially vertical plane. Suitable means (not shown) are provided for coupling the antenna 279 to the optical finder assembly 275 so that both move together in elevation. These means may be either mechanical or electrical, and of any suitable type capable of assuring that elevation movement of the antenna is synchronized with movement of the elevation drive motor 277. Since the director housing 270, radar antenna 279 and optical finder assembly 275 all are rigidly mechanically connected together for movement in the horizontal plane, they necessarily move in synchronism in train. As noted above, movement in train is effected by the train drive motor 260.

If desired, manual control means may be provided for enabling the operator to electrically or mechanically override the radar controlled train and elevation drive systems, to permit slewing or straight manual operation. Such manual over-ride may be provided in any convenient manner. For example, a handlebar 283 may be provided rotatable about a vertical axis to control operation of the train drive system and rotatable about a horizontal axis to control the elevation drive in conventional manner. Foot rests 285, only one of which is illustrated in FIGURE 11, may be provided if necessary for comfort of the operator.

The director unit of FIGURE 11 may be connected into a fire control system as illustrated in FIGURE 10 or it may be used simply as a radar tracking device of general utility. In either case its drive system, including the preamplifier, power drive amplifier and response elements, is electrically connected in substantially the manner shown for the director portion of the system of FIGURE 10.

While the invention has been described in the foregoing with particular reference to fire control systems, it will be apparent to those skilled in the art that in many of its aspects the invention is not limited to use in such systems, but is of general utility and usable to advantage in many other applications such, for example, as industrial control, wherein the position or velocity of movement of an object having substantial inertia is to be remotely controlled. Similarly, while the invention has been illustrated as embodied in a system of electrically powered type, it is also applicable to systems of other types such, for example, as hydraulically actuated systems for positioning inertia loads.

While a number of specific embodiments of the invention have been shown and described, it will be understood that various other modifications may be made without departing from the invention. The appended claims are therefore intended to cover all such modifications as fall within the true spirit and scope of the invention.

What is claimed is:

1. In a control system for positioning an inertia load in accordance with a supplied control signal, an inertia load, means for providing a control signal, prime mover means including a movable output member attached to said inertia load by a continuous solid substantially rigid element whereby gears are eliminated and flexure is minimized to directly drive said load simultaneously through the same angular displacement as said output member, power drive means responsive to said control signal to energize said prime mover in accordance therewith, response means coupled to said prime mover output member and said load for movement therewith and responsive to such movement to modify said control signal in a manner to obtain correspondence of load position with the control signal as initially supplied.

2. In a control system for positioning an inertia load in accordance with a supplied control signal, an inertia load, means for providing a control signal, slow speed prime mover means including a movable output member directly coupled to said inertia load to move said load at 1-to-1 speed ratio with respect to the prime mover, a response element directly coupled by a continuous solid substantially rigid element whereby gears are eliminated and flexure is minimized to said prime mover output member for movement in direct synchronism therewith and with said inertia load, said response element being sensitive to movement of said output member and its coupled load to provide a response signal indicative of such movement, and means responsive to said control and response signals for energizing said prime mover and causing movement of its output member in accordance with both said signals.

3. A closed loop servo system for positioning an inertia load in accordance with a supplied control signal comprising, an inertia load, means for providing a control signal, a slow speed rotary electric motor including a stator and rotor with the inertia of said rotor being less than one-tenth that of said inertia load, said motor being connected to said load by a continuous solid substantially rigid element whereby gears are eliminated and flexure is minimized to directly drive the same at a duty cycle speed less than 30 r.p.m., response means driven with said load and sensitive to movement thereof to produce a feedback signal, and means controlling supply of electric current to said motor responsive to said control and feedback signals.

4. A closed loop servo system for positioning an inertia load in accordance with a supplied control signal comprising, an inertia load, means for providing a control signal, a slow speed rotary electric motor including a stator and rotor with the inertia of said rotor being less than one-tenth that of said inertia load, said motor being directly coupled to said load by a continuous solid substantially rigid element whereby gears are eliminated and flexure is minimized and providing a motor-load inertial time constant of less than 1.0 sec. when directly driving the load, response means driven with said load and sensitive to movement thereof to produce a feedback signal, and means controlling supply of electric current to said motor responsive to said control and feedback signals.

5. A closed loop servo system for positioning an inertia load in accordance with a supplied control signal comprising, an inertia load, means for providing a control signal, a slow speed rotary electric motor including a stator and an armature directly connected to said inertia load by a continuous solid substantially rigid element whereby gears are eliminated and flexure is minimized with the inertia of said armature being less than one-tenth that of said load and with the armature $D^2L$-to-horsepower ratio being of the order of several thousand inches cubed per motor horsepower where D is the armature outside diameter and L its stack length, response means driven with said load and sensitive to movement thereof to produce a feedback signal, and means controlling supply of electric current to said motor responsive to said control and feedback signals.

6. A closed loop servo system for positioning an inertia load in accordance with a supplied control signal comprising, an inertia load, means for providing a control signal, a slow speed electric motor including a rotary armature of hollow construction directly driving said load thru a continuous solid substantially rigid element whereby gears are eliminated and flexure is minimized, said armature having a $D^2L$-to-horsepower ratio not less than about 2,000 inches cubed per motor horsepower where D is the armature outside diameter and L its stack length, response means driven with said load and sensitive to movement thereof to produce a feedback signal, and means controlling supply of electric current to said motor responsive to said control and feedback signals.

7. For directly driving an inertia load in a closed loop servo system, a slow speed electric motor including a field structure and an armature rotatable therein with said armature having a $D^2L$-to-horsepower ratio not less than about 2,000 inches cubed per motor horsepower where D is the armature outside diameter and L its stack length.

8. For directly driving an inertia load in a closed loop servo system, a slow speed electric motor including a field structure and an armature rotatable therein with said armature having a $D^2L$-to-horsepower ratio between about 2,000 and 20,000 inches cubed per motor horsepower where D is the armature outside diameter and L its stack length.

9. For directly driving an inertia load in a closed loop servo system, a slow speed electric motor including a field structure and an armature rotatable therein with said armature being of centrally hollow construction and having a $D^2L$-to-horsepower ratio not less than about 2,000 inches cubed per motor horsepower where D is the armature outside diameter and L its stack length.

10. For directly driving an inertia load in a closed loop servo system, a slow speed electric motor including a field structure and an armature of air gap diameter D and stack length L such that the armature $D^2L$-to-horsepower ratio is of the order of several thousand inches cubed per motor horsepower and the motion inertial time constant is less than 0.10 sec.

11. In an electrically actuated fire control system for positioning a gun in accordance with a supplied control signal, a gun, means for providing a control signal, a rotary electric motor including a stator constituting a barbette for said gun and a rotor having said gun directly mounted thereto by a continuous solid substantially rigid element whereby gears are eliminated and flexure is minimized for direct drive therebetween, means responsive to said control signal to energize said motor in accordance therewith, and response means coupled to said gun for movement therewith and sensitive to such movement to modify said control signal in a manner to obtain correspondence of gun movement therewith.

12. In a fire control system for automatically positioning a gun, a gun, target finding means having a line of sight and providing a target error signal indicative of target departure from said line of sight, prime mover means directly driving said gun and said target finding means thru a continuous solid substantially rigid element whereby gears are eliminated and flexure is minimized for causing movement of both thereof at 1-to-1 speed ratio with respect to the prime mover, power drive means responsive to said target error signal to energize said prime mover in a direction to reduce target error, target range sensing means providing a target range signal, gyro computer means coupled to said gun and prime mover for movement at 1-to-1 speed ratio therewith, said gyro computer means being responsive to gun movement and to said target range signal to produce a target lead angle signal, and means responsive to said lead angle signal for shifting the line of sight of said target finding means through the lead angle to thus place the line of sight directly on target and the gun off target by the computed lead angle.

13. In a control system for positioning an inertia load in accordance with a supplied control signal having prime mover means coupled to said inertia load, power drive means responsive to said control signal to energize said prime mover in accordance therewith, a response means coupled to said prime mover and said load for movement therewith and responsive to such movement to modify said control signal in a manner to obtain correspondence of load position with the control signal as initially supplied, the improvement characterized by a prime mover means including an output member integrally attached to an inertia load to directly drive said load thru a continuous solid substantially rigid element whereby gears are eliminated and flexure is minimized simultaneously therewith through the same angular displacement in avoidance in the system of hunting, oscillation and wander caused by backwash thereby providing optimum system accuracy, sensitivity and response speed.

References Cited in the file of this patent

UNITED STATES PATENTS

| | | |
|---|---|---|
| 2,440,968 | Moore et al. | May 4, 1948 |
| 2,444,171 | Sanders | June 29, 1948 |
| 2,586,817 | Harris | Feb. 26, 1952 |
| 2,660,793 | Holschuh et al. | Dec. 1, 1953 |
| 2,704,490 | Hammond | Mar. 22, 1955 |
| 2,709,228 | Miller et al. | May 24, 1955 |
| 2,762,266 | Wolf | Sept. 11, 1956 |
| 2,801,544 | Wagner | Aug. 6, 1957 |
| 2,815,458 | Staak | Dec. 3, 1957 |
| 2,878,466 | Shank et al. | Mar. 17, 1959 |

Disclaimer 3,019,711.—*Francis M. Bailey*, Scotia, N.Y., and *Eugene B. Canfield*, Pittsfield, Mass. CONTROL SYSTEMS FOR POSITIONING OBJECTS HAVING HIGH INERTIA. Patent dated Feb. 6, 1962. Disclaimer filed Aug. 2, 1963, by the assignee, *General Electric Company*.

Hereby enters this disclaimer to claims 1 through 13 of said patent.

[*Official Gazette October 22, 1963.*]

Disclaimer 3,019,711.—*Francis M. Bailey*, Scotia, N.Y., and *Eugene B. Canfield*, Pittsfield, Mass. CONTROL SYSTEMS FOR POSITIONING OBJECTS HAVING HIGH INERTIA. Patent dated Feb. 6, 1962. Disclaimer filed Aug. 2, 1963, by the assignee, *General Electric Company*.

Hereby enters this disclaimer to claims 1 through 13 of said patent.

[*Official Gazette October 22, 1963.*]